May 8, 1956
R. MALCOM, JR., ET AL
2,744,523
FUME AND MIST RESPIRATOR WITH RING MEANS FOR
REMOVABLY MOUNTING THE FILTERS
Filed May 19, 1954
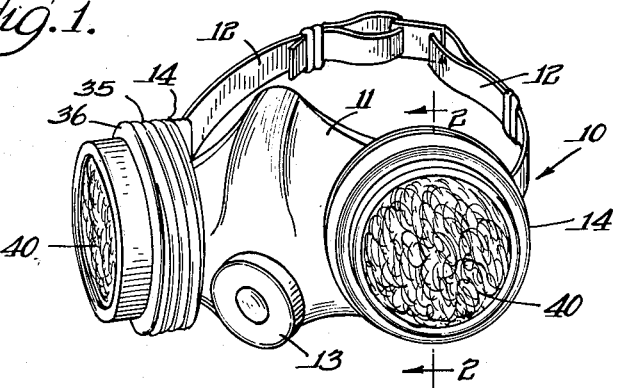
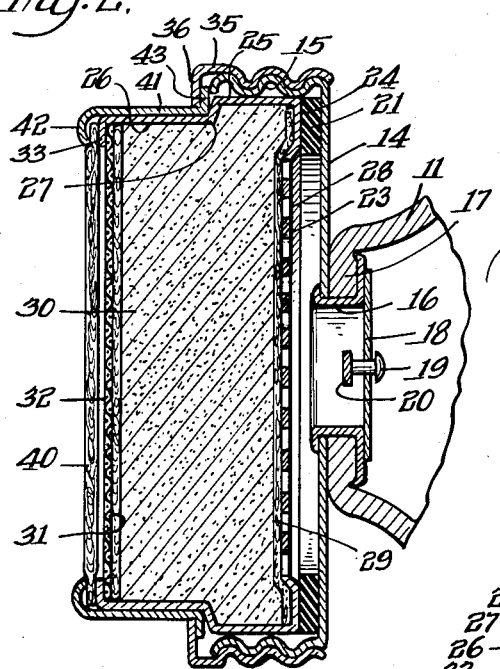
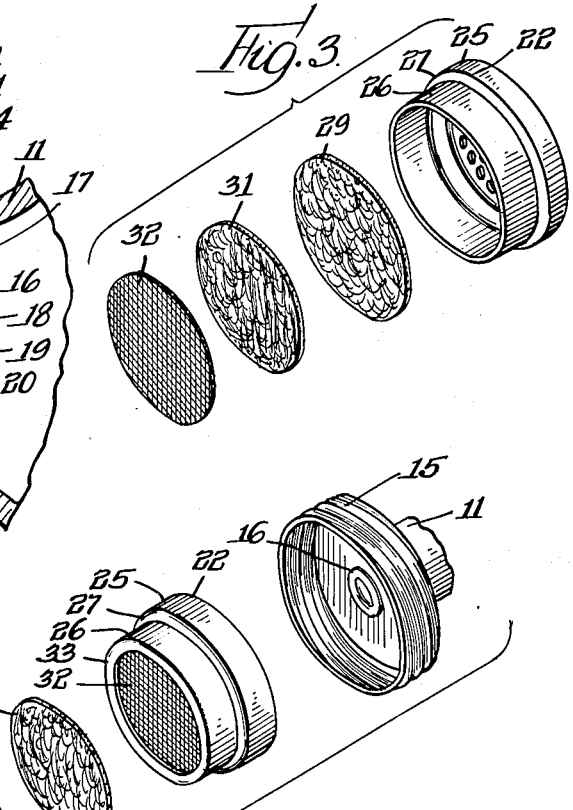
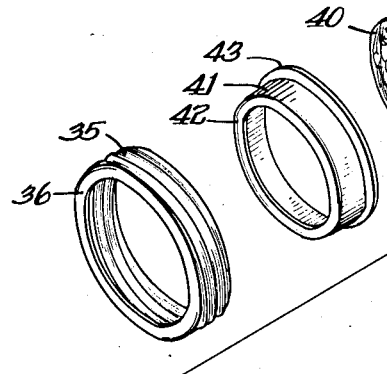
INVENTORS
Robert Malcom Jr.
Willis Z. Whipple
By: Wallenstein & Spangenberg
attys.

2,744,523

FUME AND MIST RESPIRATOR WITH RING MEANS FOR REMOVABLY MOUNTING THE FILTERS

Robert Malcom, Jr., and Willis Z. Whipple, Chicago, Ill., assignors to Chicago Eye Shield Company, Chicago, Ill., a corporation of Illinois Application May 19, 1954, Serial No. 430,854

5 Claims. (Cl. 128—146)

This invention relates to respirators and is an improvement over that disclosed in copending application Serial No. 303,293, filed August 8, 1952, by Willis Z. Whipple.

Said copending application discloses a fume respirator having a face piece including an exhale valve and a supporting member having an inhale valve, wherein the supporting member is substantially circular and peripherally provided with a screw threaded flange and has an annular resilient gasket therein, wherein a unique substantially cylindrical fume absorbing cartridge is received in the supporting member against the resilient gasket, wherein the cylindrical fume absorbing cartridge has substantially circular perforated end walls, a substantially cylindrical side wall provided with an annular shoulder intermediate its ends and fume absorbing material therein, and wherein a screw threaded ring having an inwardly extending flange engages the annular shoulder on the cartridge for removably securing and sealing the cartridge in place in the supporting member against the resilient gasket. Such a respirator with its removable and replaceable fume absorbing cartridge or cartridges gives excellent results in absorbing fumes from air breathed into the respirator.

However, when such a respirator is used in atmospheres having considerable mist, such as, for example, paint pigments where paint spraying is being done, the mist or paint pigments soon clog the fume absorbing material in the cartridge. This results in frequent and unnecessary replacement of the relatively expensive fume absorbing cartridges.

The principal object of this invention is to provide for such a respirator an auxiliary mist absorbing filter assembly which is simply and removably mounted in the respirator in conjunction with the fume absorbing cartridge, which absorbs the mist or paint pigments from the inhaled air before it reaches the fume absorbing cartridge to prevent clogging of the fume absorbing material in the cartridge, which is inexpensive and readily replaceable, and which avoids the aforementioned difficulties.

Briefly, the mist absorbing filter assembly of this invention includes a substantially circular mist absorbing filter, such as paper or the like, removably overlying the outer perforated end wall of the fume absorbing cartridge, and a ring member removably overlying a portion of the side wall of the fume absorbing cartridge and having an inwardly extending flange marginally engaging the mist absorbing filter to hold the same in place on the outer end wall of the fume absorbing cartridge and an outwardly extending flange adjacent the shoulder on the fume absorbing cartridge. When the screw threaded ring is screwed onto the screw threaded flange of the supporting member of the respirator, the inwardly extending flange of the screw threaded ring engages the outwardly extending flange of the ring member for removably securing the mist absorbing filter to the fume absorbing cartridge and for removably securing the fume absorbing cartridge in the supporting member in sealing relation with the sealing gasket. The fume absorbing filter, which is of itself inexpensive, may be readily replaced merely by manipulating the screw threaded ring and the ring member, and, yet, it is marginally securely held in place while in use by the same means that holds the fume absorbing cartridge in place in the respirator.

Further objects of this invention reside in the details of construction of the mist absorbing assembly itself and in the combination thereof with the fume absorbing cartridge and the respirator and in the cooperative relationships between the component parts thereof.

Other objects and advantages of this invention will become apparent to those skilled in the art upon reference to the accompanying specification, claims and drawing, in which:

Fig. 1 is a perspective view of the respirator of this invention with the combination fume and mist absorbing assemblies mounted therein;

Fig. 2 is a vertical sectional view taken substantially along the line 2—2 of Fig. 1;

Fig. 3 is an exploded perspective view of the parts forming the fume absorbing cartridge;

Fig. 4 is an exploded perspective view showing the supporting member, the fume absorbing cartridge, the mist absorbing assembly and the screw threaded ring.

The respirator of this invention is generally designated at 10 in Fig. 1. It includes a face piece 11 preferably formed of rubber or the like. The face piece 11 covers the nose and mouth of the wearer and is held in place by adjustable straps 12. The face piece 11 is provided with an exhale valve assembly 13 through which the breath is exhaled. A pair of supporting members 14 is secured to the face piece 11. Each supporting member is substantially circular and is peripherally provided with a screw threaded flange 15. Each supporting member 14 is secured and sealed to the face piece 11 by means of a sleeve 16 extending through holes in the supporting member 14 and in an enlarged portion 17 of the face piece 11 and being flanged over against the supporting member 14 and the face piece 11. An inhale valve 18 is associated with each supporting member 14 and is carried by a pin 19 which in turn is carried by a crossbar 20 suitably secured to the sleeve 16. These inhale valves 18 are preferably formed of rubber or the like and seat against the flanged end of the sleeve 16. These valves 18 are utilized for inhaling purposes. Upon inhaling, air is drawn through the supporting members 14 and inhale valves 18 and upon exhaling, air is discharged through the exhale valve assembly 13.

An annular resilient gasket 21 is located in each supporting member 14 adjacent the flange 15 thereof for sealing purposes. The supporting member 14 is adapted to receive a fume absorbing cartridge which may be of the type disclosed in the aforementioned copending application. The cartridge includes a casing member 22 preferably made of aluminum or the like. The casing member 22 is made in the form of a cup shape member having a substantially circular end wall 23. This end wall is provided with a plurality of perforations 28 and it is also formed outwardly to provide an annular seating surface 24. The cup shaped member also has a substantially cylindrical side wall which is divided into two portions having different diameters. The larger portion 25 of the side wall is adjacent the end wall 22 and it joins with the portion of the side wall 26 of smaller diameter through an annular shoulder 27. A disc of fibrous material 29 such as felted paper or the like is located against the end wall 22 of the cup shaped member. Granular fume absorbing material 30 such as activated carbon or the like is packed in the cup shaped member against the fibrous disc 29 and substantially completely fills the same.

Another disc of fibrous material 31 such as felted paper or the like overlies the granular fume absorbing material 30. A perforated disc 32 preferably in the form of a metallic screen is secured in the open end of the cup shaped member by spinning over the open end as indicated at 33. These cartridges thus formed, may be conveniently interchangeably secured in the supporting members 14 of the respirator.

To mount the cartridges in the respirator the larger diameter end of the cartridge is inserted in the supporting member 14 and the annular seating surface 24 engages the annular resilient gasket 21. A screw threaded ring 35 is then screwed onto the screw threaded flange 15 of the supporting member 14. This screw threaded ring 35 is provided with an inwardly extending flange 36 for engaging the annular shoulder 27 of the cartridge for the purpose of releasably securing the cartridge in the supporting member and sealing the cartridge against the annular resilient gasket 21. In this respect, the annular shoulder 27 of the cartridge lies adjacent the outer edge of the screw threaded flange 15 so that it may be engaged by the inwardly extending flange 36 of the screw threaded ring 35. To replace the cartridge when it becomes spent, all that is necessary is to remove the screw threaded ring 35. The structure of the respirator and the structure of the fume absorbing cartridges thus far described, are very much like those disclosed in the aforementioned copending application.

In accordance with this invention there is provided an auxiliary mist absorbing filter assembly which may be removably secured in place over the outer end of the fume absorbing cartridge. The mist absorbing filter assembly includes a substantially circular mist absorbing filter 40 which may be formed from felted paper or the like. This mist absorbing filter overlies the outer perforated end wall 32 of the fume absorbing cartridge. The auxiliary assembly also includes a ring member 41 preferably formed of aluminum or the like which is provided at one end with an inwardly extending flange 42 and at the other end with an outwardly extending flange 43. The ring member 41 is telescopically received over the cylindrical portion 26 of the fume absorbing cartridge. In so doing, the inwardly extending flange 42 marginally overlies the mist absorbing filter 40 for marginally holding the same against the outer end of the fume absorbing cartridge. The outwardly extending flange 43 of the ring member 41 lies adjacent the shoulder 27 on the fume absorbing cartridge. The ring member 41 operates removably to hold the mist absorbing filter 40 against the outer end of the fume absorbing cartridge and the mist absorbing filter may be readily replaced merely by removing the ring member 41.

When the fume absorbing cartridge and the auxiliary mist absorbing filter assembly are received in the supporting member and the screw threaded ring 35 is screwed onto the screw threaded flange 15 of the supporting member, the inwardly extending flange 36 of the screw threaded ring 35 engages the outwardly extending flange 43 of the ring member 41 for removably securing the mist absorbing filter assembly to the fume absorbing cartridge and for removably securing the fume absorbing cartridge in the supporting member in sealing relation with the supporting gasket with the sealing gasket 21. To remove the auxiliary mist absorbing filter assembly or the fume absorbing cartridge all that is necessary is to unscrew the ring 35 from the screw threaded flange 15 of the supporting member. Thus the mist absorbing filter, which prevents the fume absorbing cartridge from becoming clogged, may be quickly and readily replaced and also the fume absorbing cartridge may also be quickly and readily replaced when desired. The auxiliary mist absorbing filter operates to extend the useful time of the fume absorbing cartridge up to as high as 15 or 20 times when the respirator is used in an atmosphere having mist therein, than if the auxiliary mist absorbing assembly were not utilized.

While for purposes of illustration one form of this invention has been disclosed other forms thereof may become apparent to those skilled in the art upon reference to this disclosure and, therefore, this invention is to be limited only by the scope of the appended claims.

We claim as our invention:

1. A combined fume and mist respirator comprising a face piece including an exhale valve and a supporting member including an inhale valve, said supporting member being substantially circular and peripherally provided with a screw threaded flange, an annular resilient gasket in the supporting member, a substantially cylindrical fume absorbing cartridge having a substantially cylindrical side wall and perforated end walls and fume absorbing material therein, said fume absorbing cartridge being removably received in the supporting member with one of its end walls engaging the gasket, a substantially circular mist absorbing filter overlying the other end wall of the fume absorbing cartridge, a ring member for marginally and removably holding the mist absorbing filter on the fume absorbing cartridge, and a screw threaded ring screw threadedly secured to the screw threaded flange and having an inwardly extending flange engaging the ring member for removably securing the mist absorbing filter to the fume absorbing cartridge and for removably securing the fume absorbing cartridge in the supporting member in sealing relation with the resilient gasket.

2. A combined fume and mist respirator comprising a face piece including an exhale valve and a supporting member including an inhale valve, said supporting member being substantially circular and peripherally provided with a screw threaded flange, an annular resilient gasket in the supporting member, a substantially cylindrical fume absorbing cartridge having substantially circular perforated end walls, a substantially cylindrical side wall provided with an annular shoulder intermediate its ends and fume absorbing material therein, a substantially circular mist absorbing filter removably overlying the outer perforated end wall of the fume absorbing cartridge, a ring member removably overlying a portion of the side wall of the fume absorbing cartridge and having an inwardly extending flange marginally engaging the mist absorbing filter to hold the same in place on the outer end wall of the fume absorbing cartridge and an outwardly extending flange adjacent the shoulder of the fume absorbing cartridge, the exposed portion of the fume absorbing cartridge being removably received in the supporting member with its inner end wall engaging the gasket, and a screw threaded ring screw threadedly secured to the screw threaded flange and having an inwardly extending flange engaging the outwardly extending flange of the ring member for removably securing the mist absorbing filter to the fume absorbing cartridge and for removably securing the fume absorbing cartridge in the supporting member in sealing relation with the resilient gasket.

3. A combination fume and mist absorbing assembly for use in a respirator having a substantially circular supporting member peripherally provided with a screw threaded flange and a screw threaded ring cooperating with the screw threaded flange and provided with an internal flange comprising, a substantially cylindrical fume absorbing cartridge having substantially circular perforated end walls, a substantially cylindrical side wall provided with an annular shoulder intermediate its ends and fume absorbing material therein, a substantially circular mist absorbing filter removably overlying the outer perforated end wall of the fume absorbing cartridge, and a ring member removably overlying a portion of the side wall of the fume absorbing cartridge and having an inwardly extending flange marginally engaging the mist absorbing filter to hold the same in place on the outer end wall of the fume absorbing cartridge and an outwardly extending flange adjacent the shoulder on the fume absorbing cartridge, the exposed portion of the fume absorbing cartridge being removably received in the supporting member, and the mist absorbing filter being removably secured to the fume absorbing cartridge and the fume absorbing cartridge being removably secured in the supporting member by the inwardly extending flange of the screw threaded ring engaging the outwardly extending flange of the ring member when the screw threaded ring is screwed onto the screw threaded flange of the supporting member.

4. A combination fume and mist absorbing assembly comprising a substantially cylindrical fume absorbing cartridge having substantially circular perforated end walls, a substantially cylindrical side wall provided with an annular shoulder intermediate its ends and fume absorbing material therein, a substantially circular mist absorbing filter removably overlying the outer perforated end wall of the fume absorbing cartridge, and a ring member removably overlying a portion of the side wall of the fume absorbing cartridge and having an inwardly extending flange marginally engaging the mist absorbing filter to hold the same in place on the outer end wall of the fume absorbing cartridge and an outwardly extending flange adjacent the shoulder on the fume absorbing cartridge.

5. A mist absorbing assembly for use with a fume absorbing assembly including a substantially cylindrical fume absorbing cartridge having substantially circular perforated end walls, a substantially cylindrical side wall provided with an annular shoulder intermediate its ends and fume absorbing material therein, comprising, a substantially circular mist absorbing filter removably overlying the outer perforated end wall of the fume absorbing cartridge, and a ring member removably overlying a portion of the side wall of the fume absorbing cartridge and having an inwardly extending flange marginally engaging the mist absorbing filter to hold the same in place on the outer end wall of the fume absorbing cartridge and an outwardly extending flange adjacent the shoulder on the fume absorbing cartridge.

References Cited in the file of this patent

UNITED STATES PATENTS

| | | |
|---|---|---|
| 1,821,996 | Willson | Sept. 8, 1931 |
| 2,000,064 | Cover | May 7, 1935 |
| 2,505,173 | Conley | Apr. 25, 1950 |